(12) United States Patent
Forrest et al.

(10) Patent No.: US 8,852,443 B2
(45) Date of Patent: Oct. 7, 2014

(54) FILTRATION SYSTEM WITH A VARIABLE RESTRICTION ORIFICE

(75) Inventors: Todd Forrest, Cookeville, TN (US); J. Bruce Schelkopf, Zionsville, IN (US); Ted S. Loftis, Cookeville, TN (US); Barry Verdegan, Stoughton, WI (US); Wassem Abdalla, Cookeville, TN (US); Mark Wieczorek, Cookeville, TN (US); Gérard Malgorn, Quimper (FR); Charles W. Hawkins, Sparta, TN (US); Chad Thomas, Cookeville, TN (US); Joe Saxon, Cookeville, TN (US); Mark Johnson, Cookeville, TN (US); Naren Shaam, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1494 days.

(21) Appl. No.: 11/854,019

(22) Filed: Sep. 12, 2007

(65) Prior Publication Data

US 2009/0065447 A1    Mar. 12, 2009

(51) Int. Cl.
*B01D 35/153* (2006.01)
*B01D 35/157* (2006.01)
*F16K 15/02* (2006.01)

(52) U.S. Cl.
CPC ........ *B01D 35/153* (2013.01); *B01D 2201/316* (2013.01); *B01D 35/1576* (2013.01)
USPC ............. 210/767; 210/97; 210/101; 210/130; 210/137; 210/234; 210/235; 251/95; 251/100; 251/98; 251/99; 251/128; 251/205; 251/208; 251/315.01; 251/339; 251/351; 251/352

(58) Field of Classification Search
USPC .......................................................... 210/767
See application file for complete search history.

(56) References Cited

U.S. PATENT DOCUMENTS

| | | | |
|---|---|---|---|
| 5,362,390 A | 11/1994 | Widenhoefer et al. | |
| 5,846,417 A | 12/1998 | Jiang et al. | |
| 6,053,334 A | 4/2000 | Popoff et al. | |
| 6,113,781 A | 9/2000 | Popoff et al. | |
| 6,171,491 B1 | 1/2001 | Popoff et al. | |
| 6,495,042 B1 | 12/2002 | Knight | |
| 6,555,000 B2 * | 4/2003 | Knight | 210/416.4 |
| 6,792,918 B1 * | 9/2004 | Halsall | 123/446 |
| 6,884,349 B1 | 4/2005 | Jiang | |

OTHER PUBLICATIONS

PDF of U.S. Appl. No. 11/780,176.*
International Search Report of PCT/US2008/069163, dated Dec. 30, 2008.
Written Opinion of the International Searching Authority of PCT/US2008/069163, dated Dec. 30, 2008.

(Continued)

Primary Examiner — Allison Fitzsimmons
(74) Attorney, Agent, or Firm — Foley & Lardner LLP

(57) ABSTRACT

Various "no filter, no run" fuel filtration designs are described that include a variable restriction orifice (VRO) designed to vary the amount of fluid, for example fuel, that reaches a fluid outlet. The VRO has a fully open position at which a maximum non-zero fluid flow is permitted, and a fully closed position at which a limited amount of fluid can flow to the outlet. In the case of diesel fuel, the amount of fuel flow permitted at the fully closed position provides lubrication of downstream fuel system components, for example the fuel pump, but is insufficient to permit engine operation.

24 Claims, 11 Drawing Sheets

(56) References Cited

OTHER PUBLICATIONS

U.S. Appl. No. 11/780,176, filed Jul. 19, 2007; Title: Standpipe With Flow Restriction Valve, and Filter Cartridge; inventor: Jiang et al., 37 pages.

U.S. Appl. No. 11/937,700, filed Nov. 9, 2007; Title: Standpipe With Flow Restriction Valve, and Filter Cartridge; inventor: Jiang et al.; 37 pages.

U.S. Appl. No. 11/841,071, filed Aug. 20, 2007; Title: Filter Cartridge With Flow Passage in End Plate; Inventor: Shaam; 21 pages.

U.S. Appl. No. 11/839,025, filed Aug. 15, 2007; Title: Flow Control Valve With Plate Spring Force Actuation; Inventor: Abdalla et al.; 19 pages.

U.S. Appl. No. 11/986,894, filed Nov. 27, 2007.

* cited by examiner

*Fig.* 1
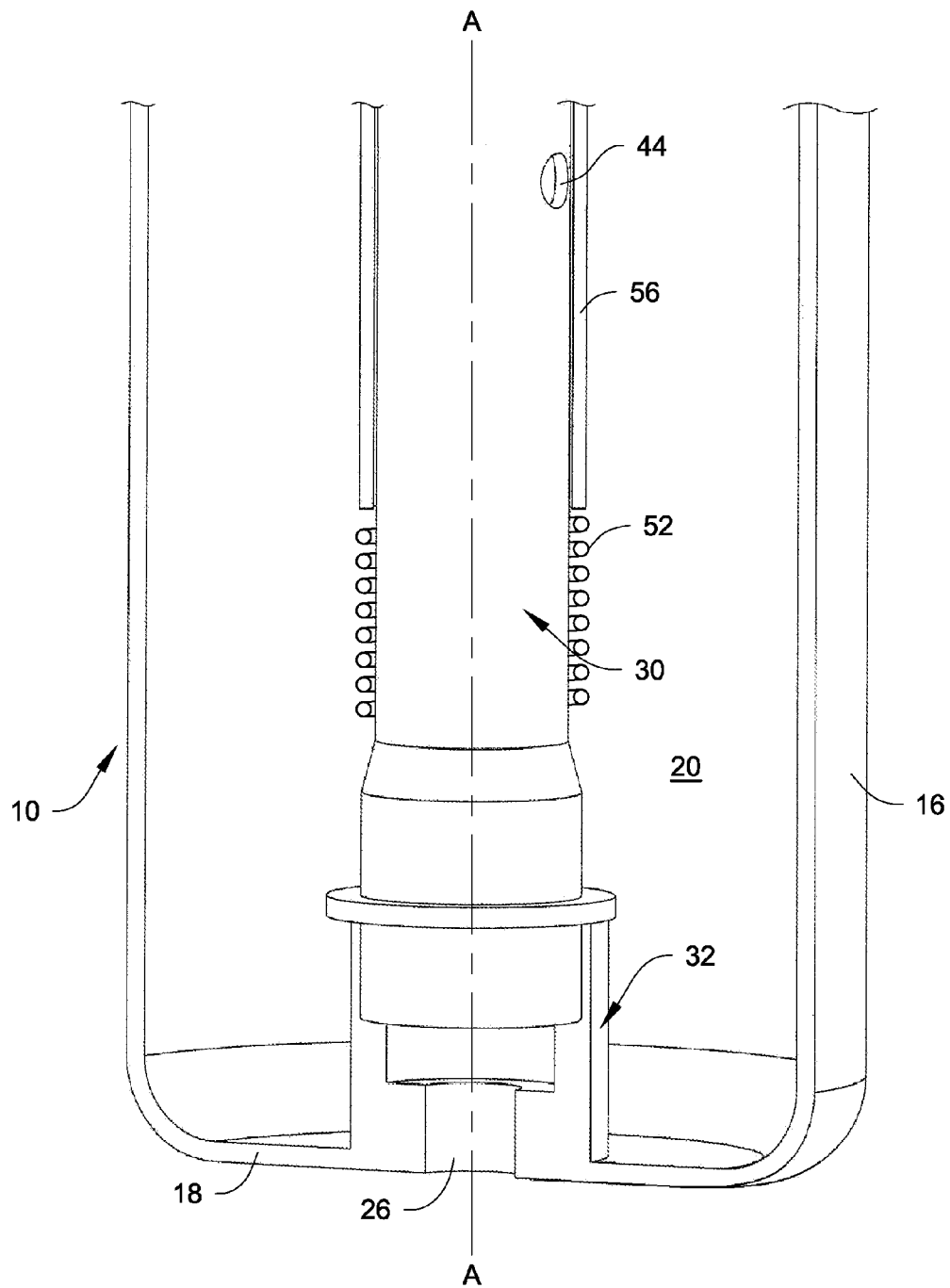

FILTRATION SYSTEM WITH A VARIABLE RESTRICTION ORIFICE

FIELD

This disclosure generally relates to the field of filtration, and more particularly to a fuel filtration system.

BACKGROUND

Filtration systems are known where a valve in a filter housing is used to control the flow of a fluid in a fluid passageway, for example a fluid passageway that connects a fluid inlet and a fluid outlet. A fuel filtration system is one example. In a fuel filtration system, the valve can be incorporated on a standpipe that is connected to the filter housing. The valve is typically designed to be movable between a closed position, where no fuel flow is permitted to the fuel outlet, and an open position, where maximum fuel flow is permitted to the fuel outlet. However, in some instances, for example a diesel engine operating on diesel fuel, a certain amount of fuel flow to fuel system components downstream from the filter housing may be desirable in order to lubricate the downstream components.

SUMMARY

A filtration system, for example a fuel filtration system, is described that includes a variable restriction orifice (VRO) or valve that is designed to vary the amount of flow from a fully open to a fully closed position, with fluid flow being permitted in the fully closed position. When the filtration system is used in a diesel engine to filter diesel fuel, the fuel flow permitted by the VRO when in the fully closed position permits lubrication of one or more downstream fuel system components, for example the fuel pump. However, the amount of fuel flow is insufficient to permit the engine to operate.

In one embodiment, a VRO is obtained by a standpipe with a flow control sleeve. In one implementation, the sleeve is slideably disposed on the standpipe that includes an opening into the interior of the standpipe. When in the fully closed position, the sleeve and standpipe allow a limited amount of fuel to flow into the standpipe and to an outlet in order to lubricate downstream engine components.

In another embodiment, a VRO is obtained by a valve plunger and a plunger seat. Geometries of the plunger seat and/or the valve plunger may be selected to permit limited fuel flow when the valve plunger and plunger seat are in a fully closed position. The particular design of the geometry selected may be guided by the desired flow rate.

A VRO can be incorporated in any fuel filtration system, including those designed to prevent engine operation when no filter cartridge is installed or when the incorrect filter cartridge is installed. By incorporating the VRO concept in these "no filter, no run" systems, the need for a positive seal, for example an elastomer seal, can be eliminated. Since fuel flow is permitted when the VRO is fully closed, VRO components can be manufactured with less exacting tolerances since the components need not completely shut off fuel flow, thereby reducing manufacturing costs.

BRIEF DESCRIPTIONS OF THE DRAWINGS

FIG. 1 is a sectional view of a portion of a filter housing incorporating a VRO.

DETAILED DESCRIPTION

Figure 2A:
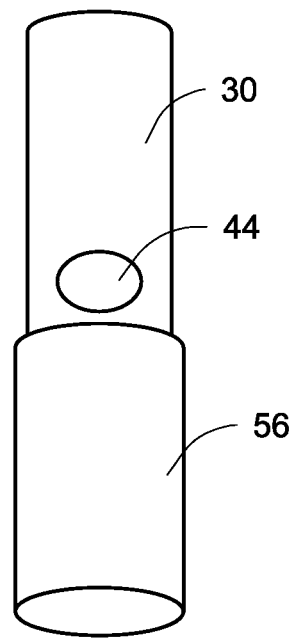
FIG. 2A is a perspective view of a VRO in the form of a sleeve disposed on a standpipe, with the VRO in an open position.

A "no filter, no run" filtration system, for example a fuel filtration system on a diesel engine that operates on diesel fuel, is designed with a variable restriction orifice (VRO) or valve that provides a first non-zero flow rate at a first extreme or open position and second non-zero flow rate at a second extreme or closed position, with the second flow rate being less than the first flow rate. The amount of flow that is permitted at the closed position is sufficient to lubricate one or more downstream components, for example the fuel pump, but is insufficient to allow the engine to operate. The following description will describe the filtration system as being a fuel filtration system, and the fluid being filtered as diesel fuel. However, in appropriate circumstances, the concepts described herein can be applied to other types of filtration systems, for example lubrication, hydraulic, other liquid applications, and air.

FIG. 1 illustrates a portion of a filter housing 10, for example a fuel filter housing, which forms part of a filter assembly that is intended to filter a fluid, for example diesel fuel, prior to the fluid reaching an engine. The housing 10 is designed to receive a filter cartridge (not shown) therein for filtering the fluid.

The filter housing 10 includes a housing body that has a side wall 16 and an end wall 18. The side wall 16 and the end wall 18 define a filter cartridge space 20 that is large enough to receive a filter cartridge therein, with the end wall 18 forming a closed end of the space 20. The housing body has an open end generally opposite the end wall 18, with the open end in use being closed by a cap (not shown) that closes off the space 20. The housing body also includes an inlet opening (not shown), which can extend, for example, through the side wall 16, and through which fuel to be filtered enters the housing 10, and an outlet 26, illustrated as extending through the end wall 18, through which fuel exits on its way to the engine. It is to be realized that the filter housing 10 could have other configurations than that described herein.

A standpipe 30 is secured to the end wall 18 and extends upwardly into the space 20 toward the open end. In the illustrated embodiment, the standpipe 30 is generally hollow from its end 32 connected to the end wall 18 to a tip end (not shown) thereof, thereby defining an internal flow passage. The flow passage is in communication with the outlet 26 so that fuel that enters the standpipe 30 can flow from the standpipe and into the outlet 26 to the engine. The standpipe 30 is disposed generally centrally in the housing 12, with a central axis A-A of the standpipe 30 generally coaxial with a central axis of the space 20.

The standpipe 30 and its internal flow passage can have any cross-sectional shape, suitable for use in the filter housing 10. For example, in the embodiment illustrated in FIG. 1, the standpipe 30 is generally cylindrical with its internal flow passage being generally circular along its length when the standpipe 30 is viewed in a cross-section taken perpendicular to the central axis A-A. However, the standpipe 30 and its internal passage could have other configurations, such as non-cylindrical and non-circular. For example, the passage could be oval in cross-section.

One or more orifices 44 are formed in the standpipe 30 to place the exterior of the standpipe in communication with the internal flow passage. In the illustrated embodiment, one orifice 44 is present. However, a larger number of orifices 44 can be provided.

A sleeve 56 is disposed on the standpipe 30 that controls the flow of fuel into the standpipe through the orifice 44. The sleeve 56 is axially moveable between a closed position (FIG. 2B) and an open position (FIG. 2A), with one or more members on an installed filter cartridge (not shown) designed to urge the sleeve 56 downwardly so as to actuate the sleeve to the open position. A coil spring 52 disposed around the standpipe 30 and engaged with the base of the sleeve 56 biases the sleeve 56 back to the closed position upon removal of the filter cartridge. Further information on how a filter cartridge can actuate a sleeve from a closed to an open position is disclosed in U.S. Pat. No. 6,113,781.

Figure 2B:
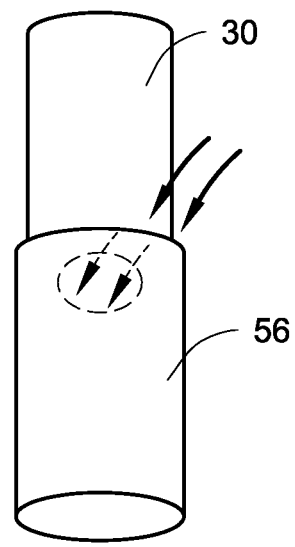
FIG. 2B is a perspective view of the VRO of FIG. 2A in a closed position.

The orifice 44 and the sleeve 56 together form a VRO or valve. With reference to FIG. 2A, when the sleeve 56 is in the open position when an appropriately designed filter cartridge is installed, the orifice 44 is uncovered, and a maximum fuel flow rate into the orifice 44 is allowed. When the filter cartridge is removed, the spring 52 biases the sleeve 56 upward to the closed position shown in FIG. 2B. At the closed position, the orifice 44 is covered by the sleeve 56. However, the sleeve 56 and standpipe 30 are designed such that a gap is provided therebetween which permits a limited amount of fuel to flow into the orifice 44 through the gap between the sleeve and the standpipe as shown by the arrows in FIG. 2B. The amount of fuel flow permitted into the standpipe 30 at the closed position should be insufficient to permit engine operation, but sufficient to, for example, provide lubrication to one or more downstream components.

The orifice 44 and gap between the sleeve and the standpipe can be designed with any shape or size, and the particular design may depend upon the desired amount of fuel flow in the closed position. Any means of permitting limited fuel flow into the standpipe when the VRO or valve is closed can be used.

Figure 3A:
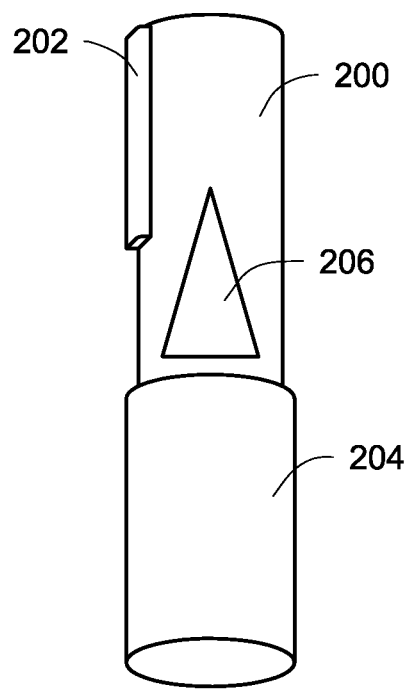
FIG. 3A is a perspective view of another embodiment of a VRO in the form of a sleeve disposed on a standpipe, with the VRO in an open position.
Figure 3B:
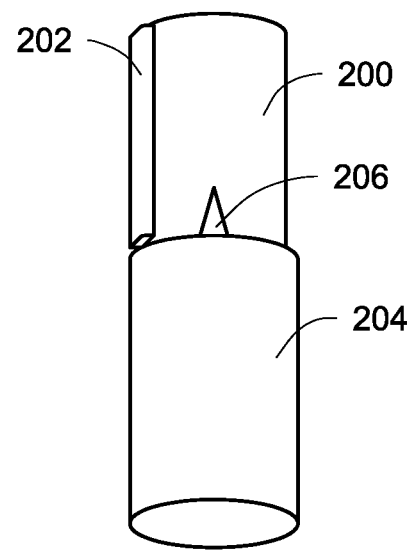
FIG. 3B is a perspective view of the VRO of FIG. 3A in a closed position.

With reference to FIGS. 3A-3B, an alternative embodiment of a VRO is illustrated. In this embodiment, a standpipe 200 is provided with a triangular orifice 206. A sleeve 204 is slideably disposed on the standpipe 200 and is axially moveable between an open position (FIG. 3A) and a closed position (FIG. 3B). At the open position, a maximum fuel flow rate into the orifice 206 is allowed. At the closed position, the sleeve 204 does not completely cover the orifice 206. Instead, a portion of the orifice remains uncovered, permitting the limited amount of fuel flow into the standpipe 200. A stop 202 on the standpipe 200 limits the upward travel of the sleeve 204. Altering the position of the stop 202 can be used to control how much of the orifice 206 remains open when the sleeve 204 is at the closed position. In addition, the hardstop 202 is illustrated as being rectangular, but is not particularly limited in shape and size.

Figure 4A:
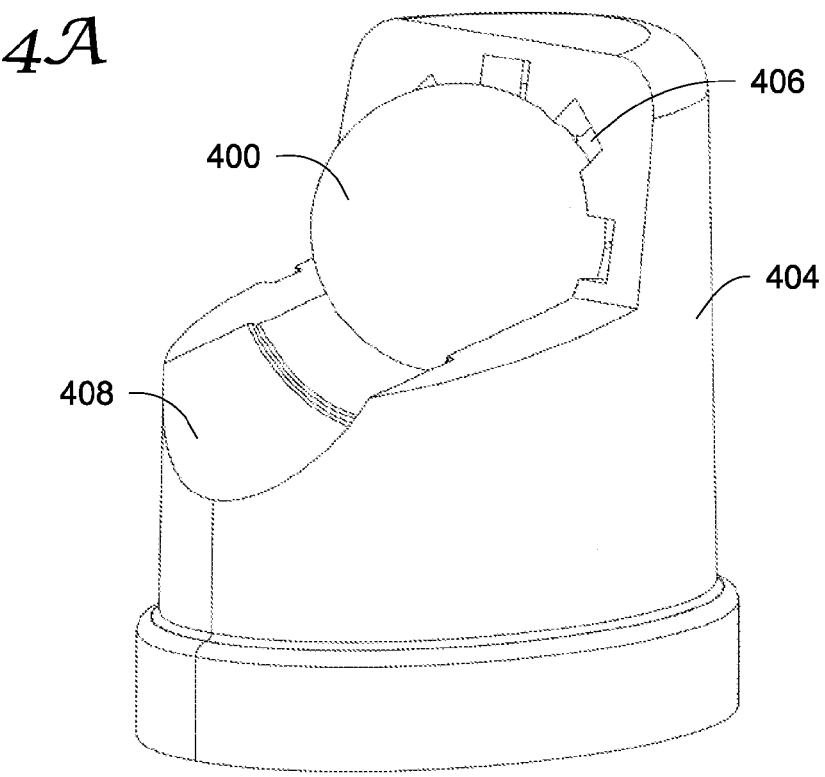
FIG. 4A is a perspective view of another embodiment of a VRO that is in a closed position.
Figure 4B:
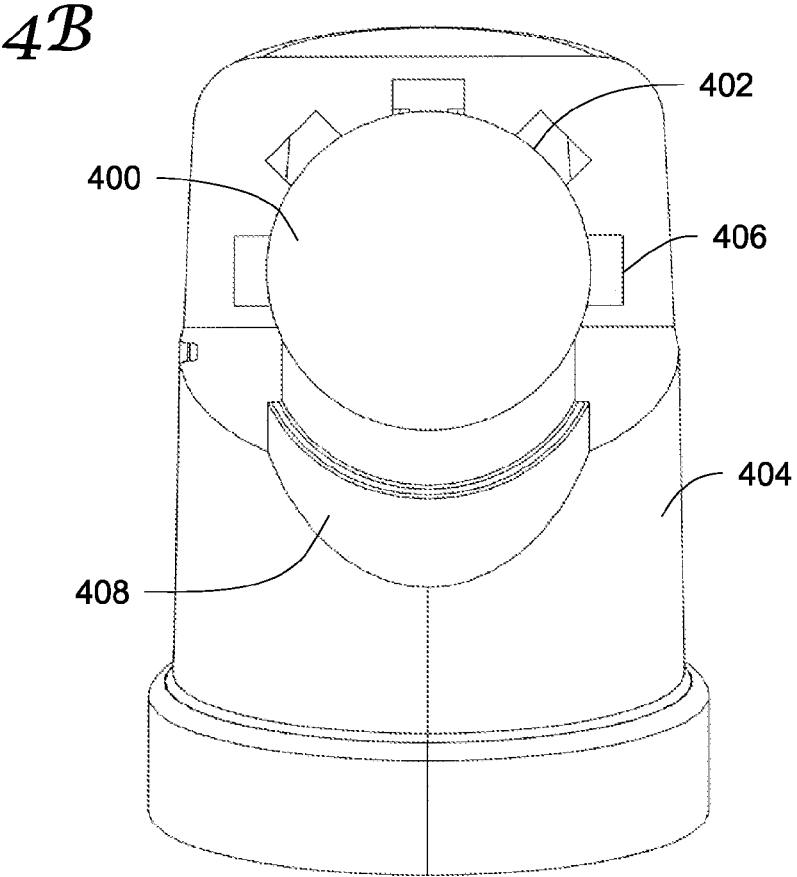
FIG. 4B is an end view of the VRO of FIG. 4A.

The concept of a VRO permitting fuel flow past a fully closed valve can with other types of valves. FIGS. 4A and 4B illustrate a ball 400 that is used to control flow through an opening 402 in a valve cap 404 that is configured to be disposed at the upper end of a standpipe (not shown). Fuel enters the cap 404 through the opening 402 and then flows into the internal flow passage of the standpipe. The ball 400 can seat in the opening as shown in FIGS. 4A and 4B to control flow into the standpipe. The opening 402 is formed with slots 406. The ball 400 is movable along a sloped track 408 formed on the valve cap 404 away from the opening 402 to an open position allowing maximum fuel flow through the opening and into the standpipe. When the ball 400 seats in the opening in the closed position shown in FIGS. 4A and 4B the majority of the opening is blocked. However, a limited amount of fuel can flow past the ball through the slots 406 and into the standpipe.

Figure 5A:
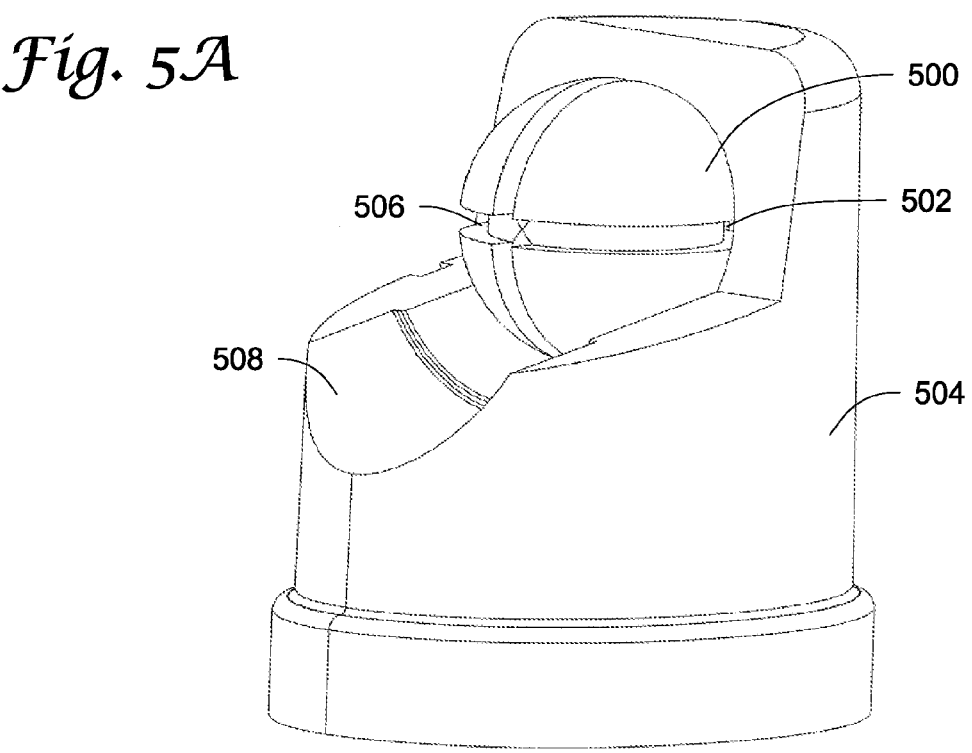
FIG. 5A is a perspective view of another embodiment of a VRO that is in a closed position.
Figure 5B:
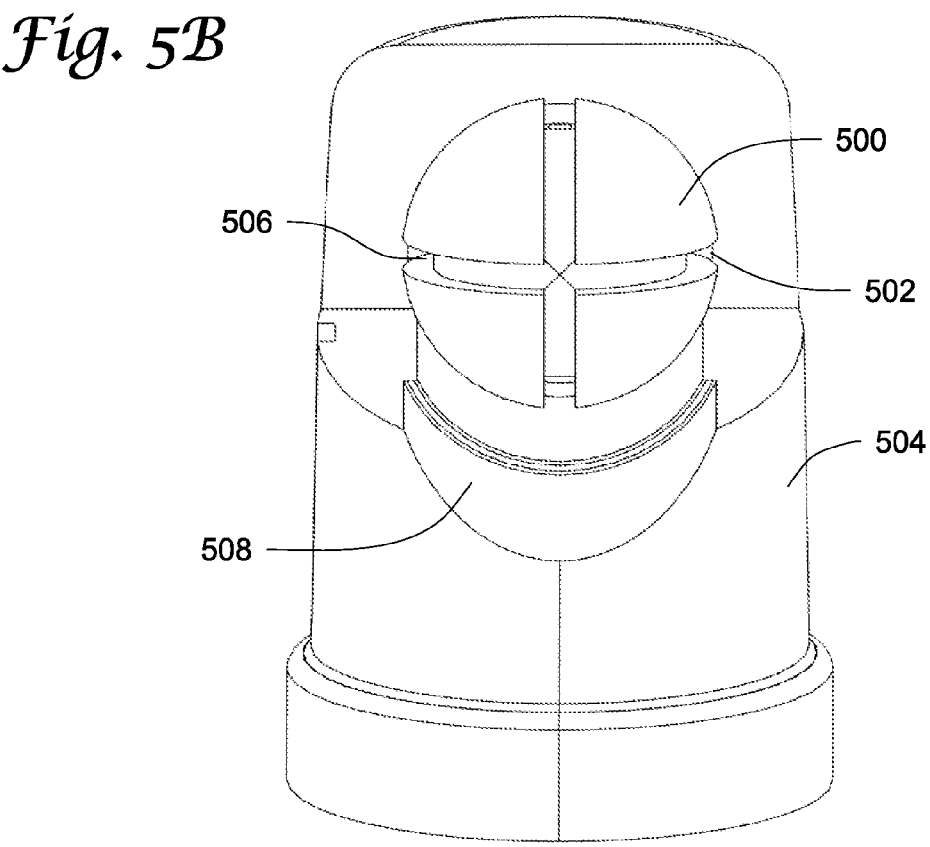
FIG. 5B is an view of the VRO of FIG. 5A.

FIGS. 5A and 5B illustrate another embodiment of a valve employing a ball 500 to control flow through an opening 502 in a valve cap 504 at the end of a standpipe. The ball 500 is formed with grooves 506. The ball 500 is movable along a track 508 formed on the valve cap 504 away from the opening 502 to an open position allowing maximum fuel flow through the opening and into the standpipe. When the ball 500 seats in the opening in the closed position shown in FIGS. 5A and 5B the majority of the opening 502 is blocked. However, a limited amount of fuel can flow past the ball through the grooves 506 and into the standpipe.

Further information on a ball controlling fuel flow through an opening in a valve cap can be found in U.S. patent application Ser. No. 11/780,176, filed on Jul. 19, 2007, the entire contents of which are incorporated herein by reference. In addition, the concept of permitting fuel flow past a ball using slots, or by forming grooves in the ball, can be employed with the ball and opening disclosed in U.S. Pat. No. 6,884,349.

The VRO concepts described herein can also be used on bottom load or spin-on filter assembly constructions, with the VRO incorporated into the filter head or housing and the VRO being actuated by a suitably designed filter cartridge that is connected to the filter head.

No Filter, No Run with Flapper Valve

Figure 6A:
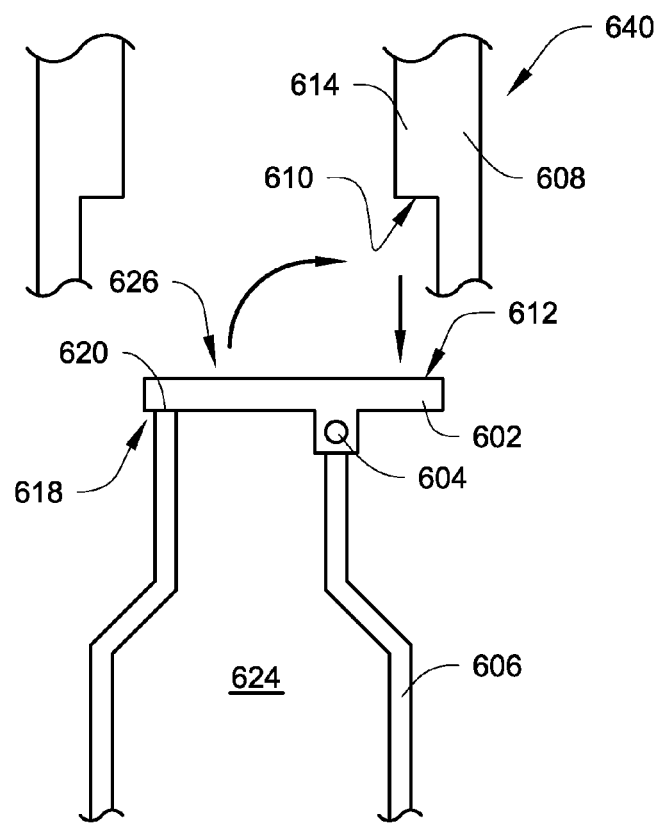
FIG. 6A is a sectional view of a standpipe with a flapper valve in the closed position.
Figure 6B:
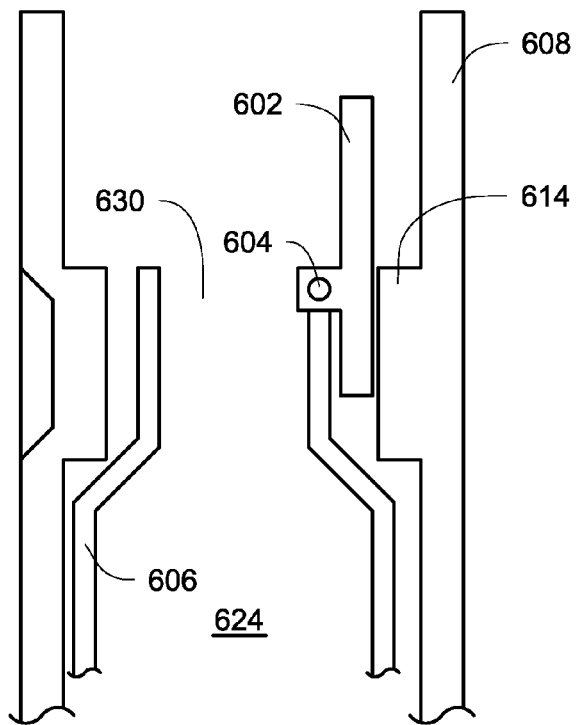
FIG. 6B is a sectional view of the standpipe of FIG. 6A with the flapper valve in the open position.

Another embodiment of a "no filter, no run" system is shown in FIGS. 6A and 6B. In this version, a flapper valve 602 is pivotally attached to a top end 618 of a standpipe 606. The pivotal attachment can be a hinge 604 that can be formed, for example, as a separate component such as a pin that connects the valve to the standpipe, a complimentary set of features on the standpipe 606 and/or on the flapper valve 602 such as integral pins, etc. The flapper valve 602 has a first end 626 and a second end 612, and is sized and shaped to cover an opening 630 at the top end 618 of the standpipe. The opening 630 leads to a passageway 624 through the standpipe. The second end 612 overhangs the edge of the standpipe 606 a sufficient distance for engagement with a centertube of an installed filter cartridge. In one embodiment, a spring (not shown) or other resilient biasing means acts on the flapper valve 602 to bias the flapper valve 602 to the closed position as shown in FIG. 6A. A spring, however, may not be always necessary. The flapper valve 602 may be mass biased toward the closed position, such that gravity closes the flapper valve 602 when a filter cartridge 640 is not installed. Therefore, any means for biasing the flapper valve toward the closed position can be used.

The filter cartridge 640 useable with the standpipe 606 includes filter media and end plates at opposite ends of the filter media. The cartridge 640 also includes a centertube 608 at the center thereof. The centertube 608 includes a protrusion 614 with a shoulder 610. The protrusion 614 and shoulder 610 can form a complete circle, or the protrusion and shoulder can be circumferentially interrupted, thereby forming a plurality of ribs.

When the cartridge 640 is installed, the centertube 608 is slid over the standpipe 606. As this occurs, the shoulder 610 (or the plurality of ribs) of the protrusion 614 engages the second end 612 of the flapper valve 602, thereby urging the flapper valve 602 to rotate on its hinge 604 to an open position to uncover the opening 630 (FIG. 6B). At the open position, maximum flow through the passageway 624 occurs and the flapper valve 602 is locked by the protrusion 614 of the centertube 608 in the open position, as shown in FIG. 6B.

The flapper valve 602 can be designed to prevent all fuel flow into the standpipe when it is at the closed position shown in FIG. 6A. Alternatively, the flapper valve 602 can incorporate the VRO concept discussed above for FIGS. 1-5 and permit limited fuel flow into the standpipe when closed. For example, openings can be formed through the flapper valve, slots can be formed on the flapper valve 602 and/or on the top end 618 of the standpipe for example between the second end 626 of the flapper valve and the top end 618 of the standpipe 606, or loose tolerances can be provided between the flapper valve and the top end of the standpipe to allow fluid past, etc. How limited fuel flow is permitted past the flapper valve 602 is not critical, so long as the amount of fuel flow permitted at the closed position is insufficient to allow the engine to operate.

No Filter, No Run with Valve at the Bottom of Filter Housing

The "no filter, no run" systems described above have utilized a standpipe in the filter housing. However, the "no filter, no run" concept need not be limited to use with a standpipe. The "no filter, no run" can also be implemented on filter housings without standpipes.

Figure 7:
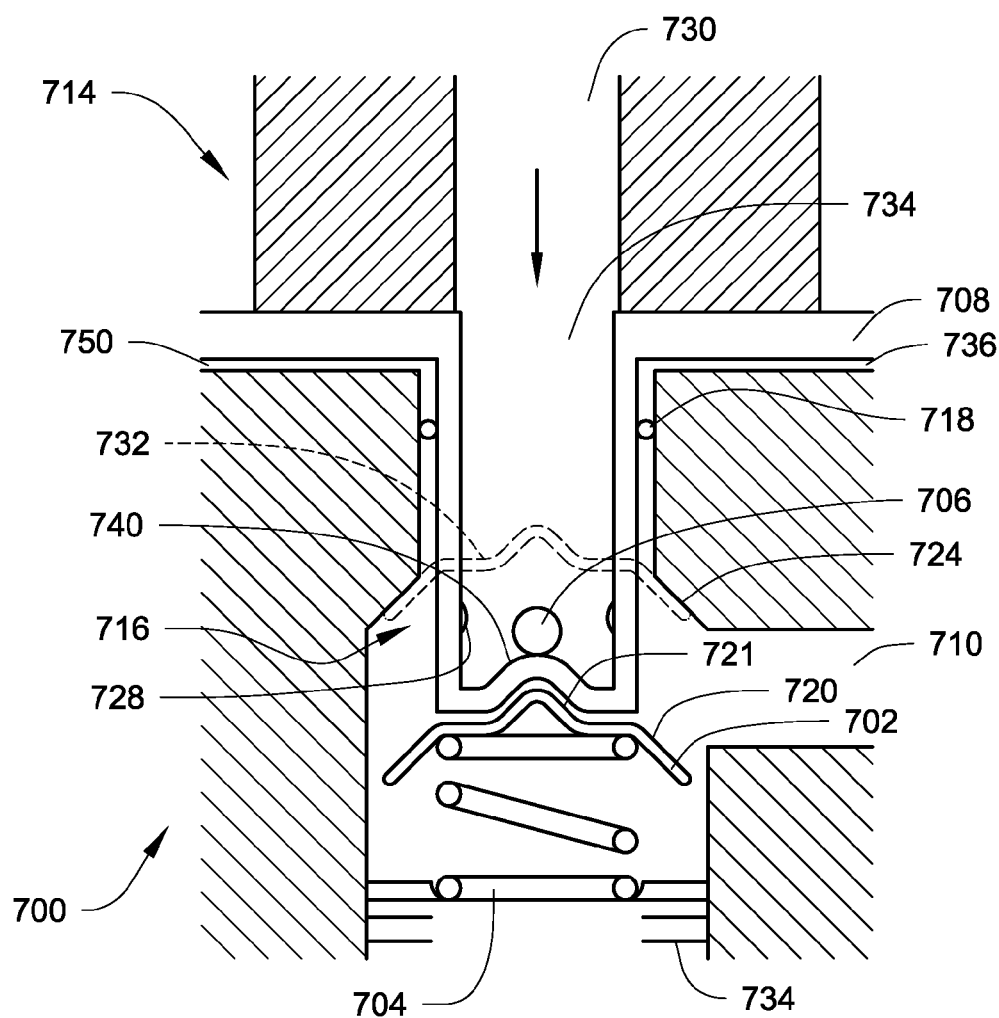
FIG. 7 is a sectional view of a valve at the base of a filter housing.

With reference to FIG. 7, a saddle shaped plate 702 is provided at the base of a filter housing 700. The housing 700 can be similar to the filter housing 10 described above in FIG. 1, but without the standpipe 30. The housing 700 includes an opening 750 at the base thereof that leads to a fuel outlet 710.

The saddle shaped plate 702 has a central region 732 and a slanted portion 720 which is slanted relative to the direction orthogonal to the cartridge installation direction, which is indicated by the arrow. A spring 704 biases the plate 702 upward to a closed position, shown in dashed lines in FIG. 7. A plug 734 seals the base of the opening 750 and supports one end of the spring 704. When at the closed position, the slanted portion 720 interfaces with a corresponding region 724 of the housing body 700 to form a seal.

The plate 702 is actuated to an open position (shown in solid lines) by a properly designed and installed filter cartridge 714. The cartridge 714 includes a protruding portion 716 that protrudes downward from an endplate 708. The protruding portion 716 is generally hollow and is in communication with the clean fuel passageway 730 of the filter cartridge through an opening 734. The bottom of the protruding portion 716 includes an inset region 740 that interfaces with the protruding central region 732 of the plate 702. The bottom portion 716 is provided with one or more openings 706 that place the interior of the protruding portion in communication with the exterior.

When no filter cartridge 714 is installed, the plate 702 is biased to the closed position by the spring 704. When a filter cartridge is installed, the protruding portion 716 enters the opening 750 and engages the plate 702. Continued insertion of the cartridge 714 pushes the plate 702 down, unseating the plate 702 from the region 724. Fuel that has been filtered by the cartridge flows from the clean fuel passageway 730, through the opening 734 in the bottom plate 708, out the openings 706, and into the outlet 710. An o-ring seal 718 can be provided around the bottom portion 716 so as to prevent unfiltered fuel from reaching the outlet 710 through gaps 736 between the cartridge 714 and the housing body 700.

The plate 702 can be designed to prevent all fuel flow into the outlet 710 when the plate is at the closed position. Alternatively, the plate 702 can incorporate the VRO concepts discussed above for FIGS. 1-5 and permit limited fuel flow into the outlet 710 when closed. For example, openings can be formed through the plate 702, slots can be formed on the slanted region 720 of the plate 702 and/or in the region 724, or loose tolerances can be provided between the plate and the region 724, etc. that allow limited fuel flow when the valve is at the closed position. How limited fuel flow is permitted past the plate 702 is not critical, so long as the amount of fuel flow permitted at the closed position is insufficient to allow the engine to operate.

Figure 8:
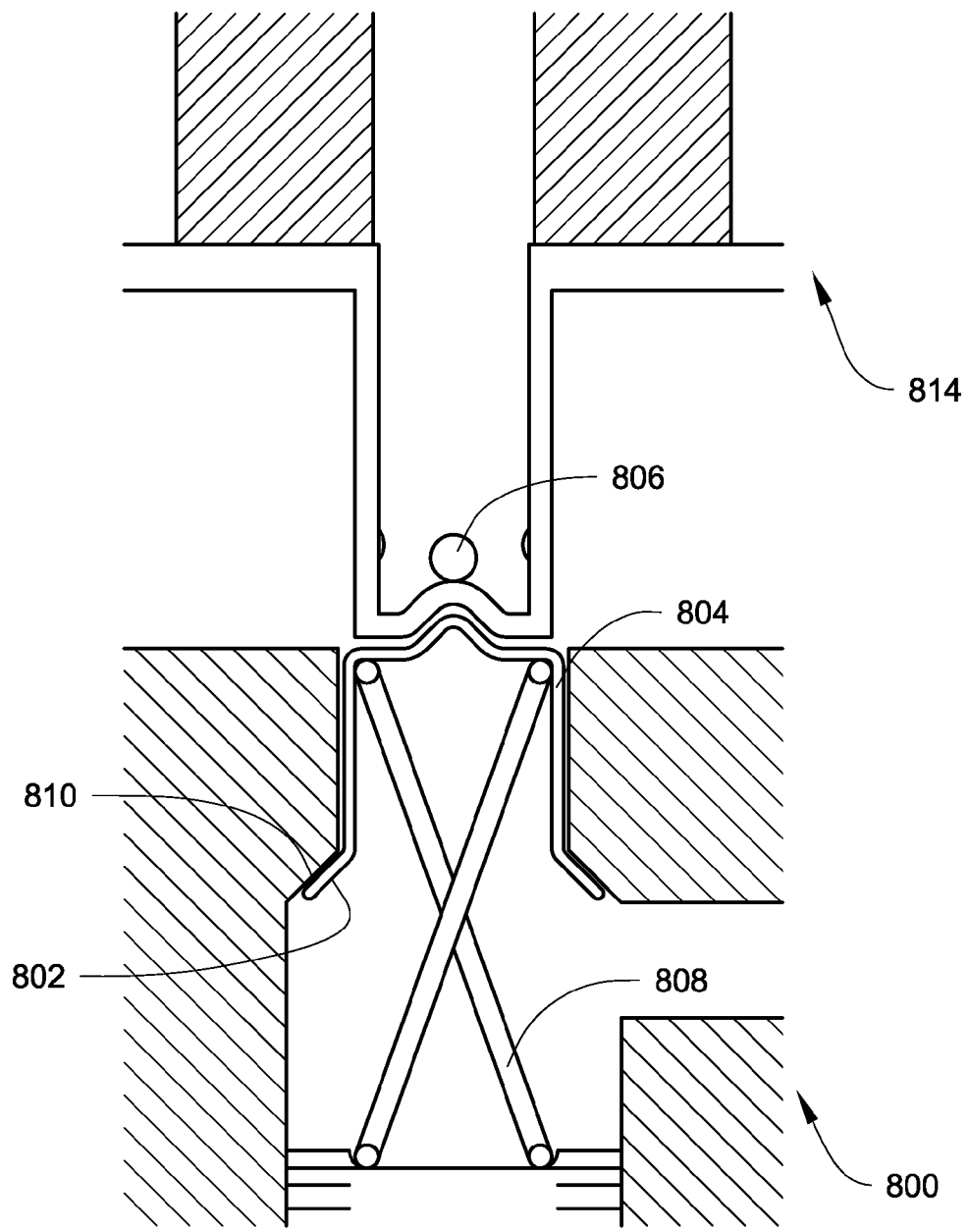
FIG. 8 is a sectional view of another embodiment of a valve at the base of a filter housing.

FIG. 8 illustrates another embodiment of a valve in a filter housing 800 without a standpipe. A plate 804 functions in a similar manner as the plate 702 described above in FIG. 7. The plate 804 includes a slanted region 802 and a corresponding sealing region 810 on the housing. The plate 804 is biased to a closed position, shown in FIG. 8, by a spring 808. The plate 804 is actuated to an open position by a filter cartridge 814 that, in the illustrated embodiment, is designed identical to the filter cartridge 714 in FIG. 7.

The function and operation of the valve 804 should be apparent. The plate 804 is actuated to the open position by a properly designed and installed filter cartridge. The plate 804 can be designed to prevent all fuel flow into the outlet when the valve is at the closed position. Alternatively, the plate 804 can incorporate the VRO concepts discussed above for FIGS. 1-5 and permit limited fuel flow into the outlet when closed.

Figure 9A:
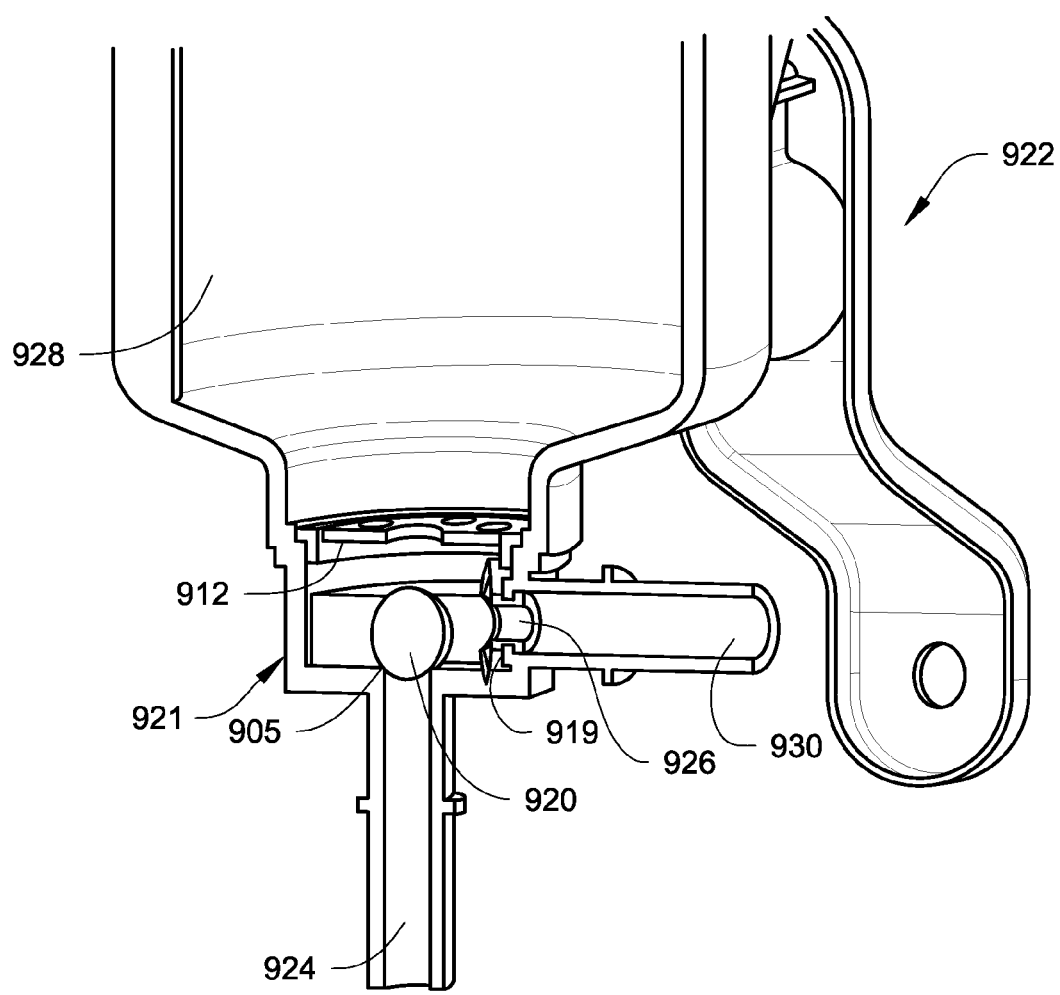
FIG. 9A is a sectional view of a housing body with a ball-shaped valve at the base of the filter housing.

With reference to FIG. 9A, a ball 920 is placed inside a sink 921 and seated on an opening 905 of a fuel outlet 924. The outlet 924 is placed at the bottom of the sink 921, which is part of a filter housing 922. Adjacent to the ball 920 inside the sink 921 is a bellow gasket 926. The bellow gasket 926 is attached to a side wall 919 of the sink 921, and is connected to a return channel 930 that leads back to a fuel tank (not shown). In a closed position (FIG. 9A), the ball 920 prevents fluid from entering the outlet 924, such that fuel enters the bellow gasket 926 and flows back to the fuel tank through the return channel 930.

Figure 9B:
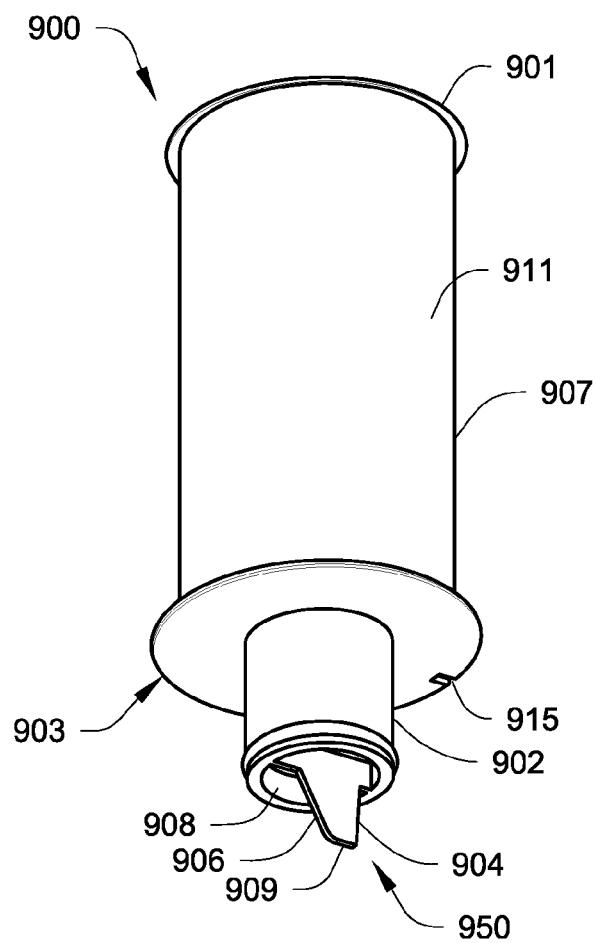
FIG. 9B is a sectional view of a cartridge with a ventral fin useable with the embodiment of FIG. 9A.

Movement of the ball 920 to an open position occurs as a result of installing a correct filter cartridge 900. With reference to FIG. 9B, the cartridge 900 includes a filter media 907, an outside portion 911, an inside portion (not shown), a top circular endplate 901, a bottom circular endplate 903 and a bottom protruding portion 902. The endplate 903 is attached to the bottom region of the filter media 907 and has a diameter that is larger than the filter media 907 of the cartridge 900. The endplate 903 has a clean fuel passageway (not shown) that is generally circular along its length. The endplate 903 is provided with a notch 915, such that the notch keys with a corresponding ridge 916 inside the housing 922. The notch 915 and ridge 916 secure the cartridge 900 in place, and also ensures that the correct filter cartridge is installed.

Figure 9C:
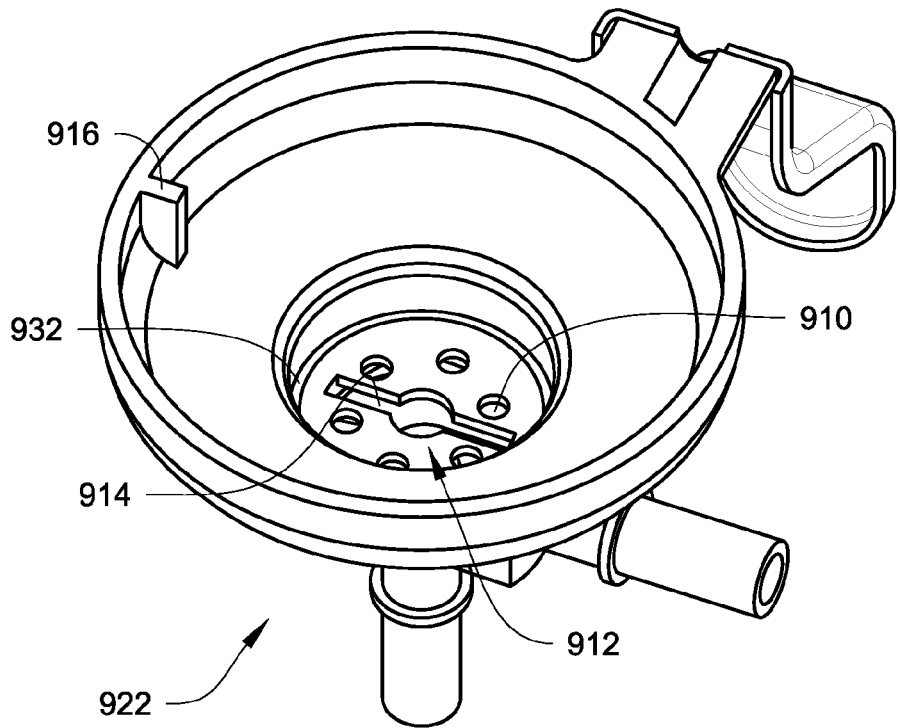
FIG. 9C is a perspective view of the filter housing of FIG. 9A.
Figure 9D:
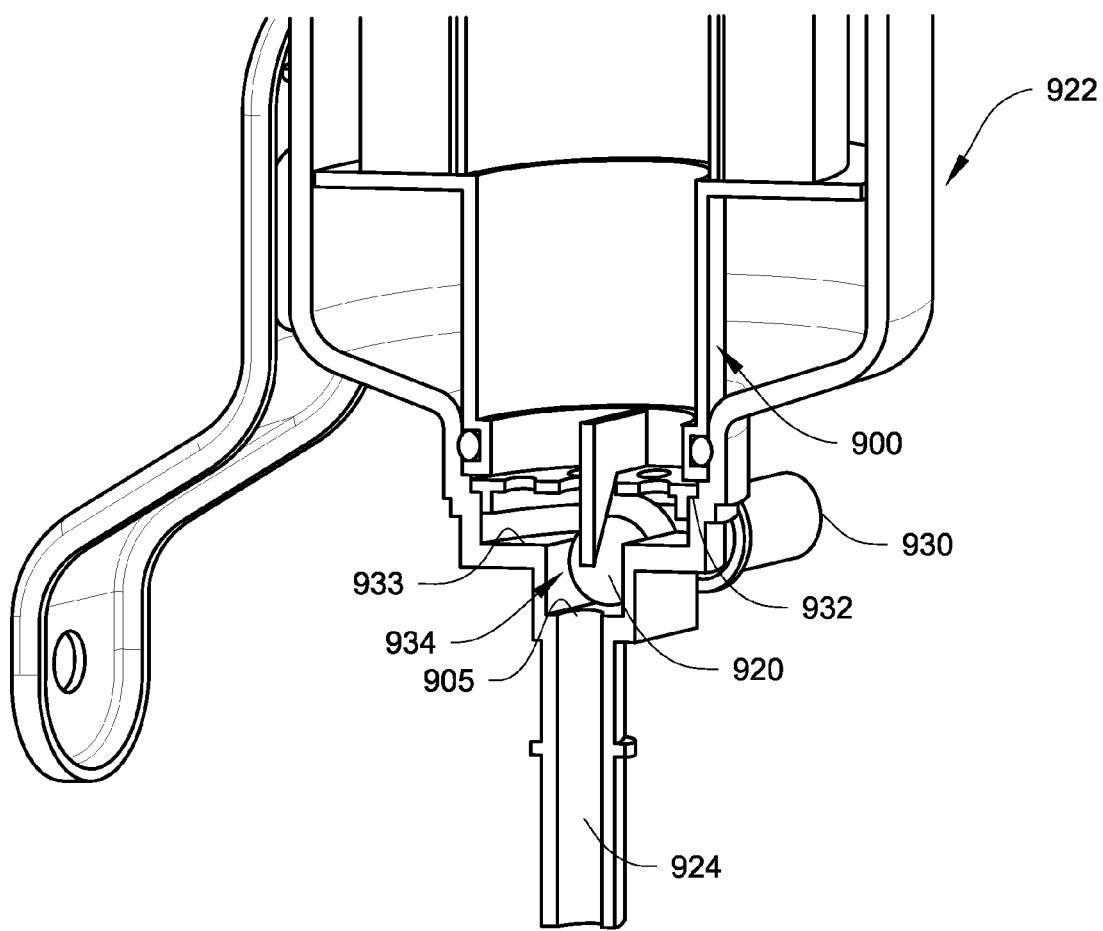
FIGS. 9D-9E are sectional views of the filter cartridge of FIG. 9B installed in the filter housing of FIG. 9A.
Figure 9E:
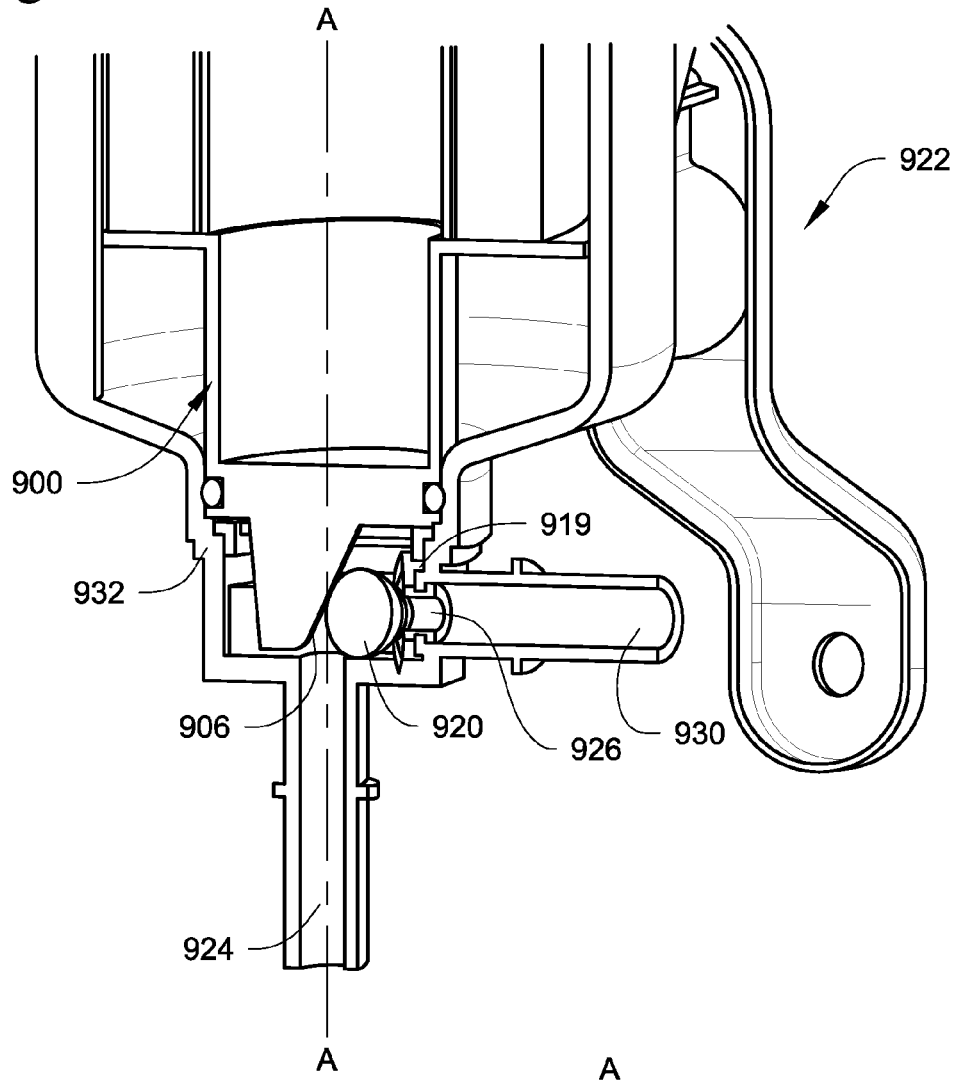
Figure 9F:
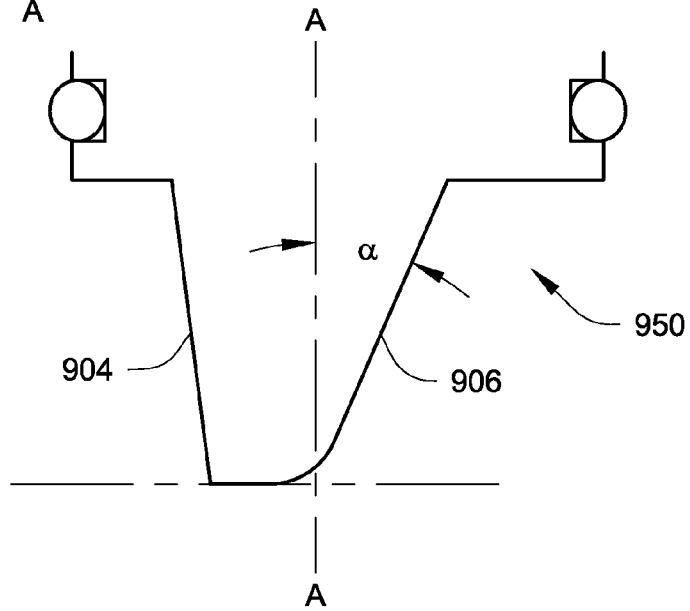
FIG. 9F is a sectional view of the ventral fin of the filter cartridge of FIG. 9B.

The bottom protruding portion 902 is generally cylindrically shaped and is hollow. It has a diameter generally corresponding to that of the clean fuel passageway of the endplate 903. The base opening 908 of the bottom protruding portion 902 is provided with a thin ventral fin 950 that runs across the center of the opening 908. The ventral fin 950 is designed to cause movement of the ball 920 to an open position when the cartridge 900 is installed. The ventral fin 950 has a slanted region 906, which has an acute angle alpha relative to a central, longitudinal axis A-A (FIG. 9F), and a generally vertical region 904 generally parallel to the axis A-A. The fin 950 is thin enough to slide through a central slit 914 of a washer 912 (FIG. 9C). The central slit 914 of the washer 912 positions the cartridge 900, and a plurality of holes 910 in the washer 912 allows fuel to pass through.

With reference to FIGS. 9A, 9C, 9D and 9E, the washer 912 is placed on a rim 932 of the sink 921. The rim 932 and the sink 921 are generally circular. The sink 921 has a depth that is larger than the diameter of the ball 920, and larger than the height of the bellow gasket 926. The opening 905 of the outlet 924 is positioned in the center of the sink 921. The bottom surface 933 of the sink 921 is provided with a bottle shaped channel 934. The bottle shaped channel 934 facilitates movement of the ball 920 toward the bellow gasket 926 when the cartridge 900 is installed.

The cartridge 900 is installed by aligning the notch 915 with the ridge 916 and inserting the ventral fin 950 through the slit 914 of the washer 912. When the ventral fin 950 extends through the slit 914, the slanted region 906 of the ventral fin 950 pushes the ball 920 in a horizontal direction relative to the axis A-A toward the bellow gasket 926. When the flat end 909 on the tip of the ventral fin 950 sits inside the neck of the bottle shaped channel 934, the ball 920 is in an open position, positioned to prevent fuel from entering the bellow gasket 926 and to allow fluid to flow through the outlet 924.

The ball 920 can be designed to prevent all fuel flow into the outlet 924 when the ball is at the closed position. Alternatively, the ball 920 can incorporate the VRO concepts discussed above for FIGS. 1-5 and permit limited fuel flow into the outlet 924 when closed. For example, slots can be formed on the ball 920 and/or grooves can be formed on the wall defining the opening 905 similar to FIGS. 4A-B and 5A-B discussed above, or loose tolerances can be provided between the ball and the opening, etc. that allow limited fuel flow when the ball is at the closed position. How limited fuel flow is permitted past the ball 920 is not critical, so long as the amount of fuel flow permitted at the closed position is insufficient to allow the engine to operate.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fuel filtration system of an engine, comprising:
    a fuel passageway that communicates fuel to the engine; and
    a variable restriction orifice controlling fuel flow through the fuel passageway, the variable restriction orifice is configured to be movable between first and second extreme movement positions, the first extreme movement position is configured as a fully open position at which a first non-zero fuel flow rate through the fuel passageway is provided and the second extreme movement position is configured as a fully closed position at which a second non-zero fuel flow rate through the fuel passageway is provided, wherein the first flow rate is greater than the second flow rate, the second flow rate is an amount insufficient to permit the engine to operate, and the variable restriction orifice is configured to permit fuel to flow through the fuel passageway at the second non-zero fuel flow rate when the variable restriction orifice is at the fully closed position.

2. The fuel filtration system of an engine of claim 1, wherein the fuel passageway is defined by a standpipe of the fuel filtration system.

3. The fuel filtration system of an engine of claim 2, wherein the variable restriction orifice comprises a sleeve slidably disposed on the standpipe.

4. The fuel filtration system of an engine of claim 3, wherein the variable restriction orifice further comprises at least one opening in the standpipe that places the fuel passageway in communication with an exterior of the standpipe.

5. The fuel filtration system of an engine of claim 2, wherein the variable restriction orifice comprises a ball.

6. The fuel filtration system of an engine of claim 2, wherein the variable restriction orifice comprises a flapper valve connected to the standpipe.

7. The fuel filtration system of an engine of claim 1, comprising a housing body having a side wall and an end wall defining a filter cartridge space, the end wall forming a closed end of the filter cartridge space, and the body having an open end opposite the end wall, and the variable restriction orifice comprises a valve connected to the housing body.

8. The fuel filtration system of an engine of claim 7, wherein the valve comprises a ball or a plate.

9. The fuel filtration system of an engine of claim 1, wherein the second non-zero fuel flow rate is created by a loose tolerance, a partially covered opening, at least one slot, or at least one groove.

10. A fuel filter assembly of an engine, comprising:
    a fuel filter housing including:
        a structure defining a fuel passageway that is in communication with the engine, the structure including an opening therein through which fuel can flow to reach the fuel passageway;
        a ball disposed on the structure that controls fuel flow through the opening to the fuel passageway, the ball is configured to be movable between first and second extreme movement positions, the first extreme movement position is configured as a fully open position at which a first non-zero fuel flow rate through the fuel passageway is provided and the second extreme movement position is configured as a fully closed position at which a second non-zero fuel flow rate through the fuel passageway is provided, wherein the first flow rate is greater than the second flow rate, the second flow rate is an amount insufficient to permit the engine to operate; and the structure is configured to permit fuel to flow into the fuel passageway and through the fuel passageway at the second non-zero fuel flow rate when the ball is at the fully closed position;

a filter cartridge connected to the filter housing, the filter cartridge preventing the ball from reaching the fully closed position.

11. The fuel filter assembly of an engine according to claim 10, wherein the housing comprises a housing body having a side wall and an end wall defining a filter cartridge space, the end wall forming a closed end of the filter cartridge space, and the housing body having an open end opposite the end wall; the structure comprises a standpipe secured to the end wall and extending into the filter cartridge space, the standpipe including the fuel passageway and the opening.

12. The fuel filter assembly of an engine according to claim 11, wherein the ball is connected to the standpipe.

13. The fuel filter assembly of an engine according to claim 10, wherein the fuel filter housing further comprises a housing body having a side wall and an end wall defining a filter cartridge space, the end wall forming a closed end of the filter cartridge space, and the housing body having an open end opposite the end wall; the ball is connected to the housing body.

14. The fuel filter assembly of an engine according to claim 13, wherein the filter cartridge includes a bottom endplate, and a protruding portion extending from the endplate that engages with the ball.

15. The fuel filter assembly of an engine according to claim 14, wherein the protruding portion includes a fin having a slanted edge.

16. A fuel filtration system of an engine, comprising:
a fuel filter housing that is configured to receive a filter cartridge in an interior space thereof, the fuel filter housing includes a standpipe having an internal fuel passageway that communicates fuel to the engine;
an opening in the standpipe that places the fuel passageway in communication with the interior space;
a valve engaged with the standpipe and controlling fuel flow through the opening of the standpipe and into the internal fuel passageway, the valve is configured to be moveable between first and second extreme movement positions, the first extreme movement position is configured as a fully open position at which a first non-zero fuel flow rate of fuel into the fuel passageway is provided and the second extreme movement position is configured as a fully closed position at which a second non-zero fuel flow rate of fuel into the fuel passageway is provided, wherein the first flow rate is greater than the second flow rate, the second flow rate is an amount insufficient to permit the engine to operate;

the standpipe is configured to permit fuel to flow into the fuel passageway of the standpipe at the second non-zero fuel flow rate when the valve is at the fully closed position;

a filter cartridge installed in the interior space of the fuel filter housing, the filter cartridge is configured to prevent the valve from reaching the fully closed position.

17. The fuel filtration system of an engine according to claim 16, wherein the valve comprises a sleeve slidably disposed on the standpipe, a ball connected to the standpipe, or a flapper valve connected to the standpipe.

18. The fuel filtration system of an engine of claim 5, wherein the standpipe includes an opening therein that is in communication with the fuel passageway, and the ball and the opening are configured to permit the ball to seat in the opening at the second extreme movement position, the ball blocking a majority of the opening when the ball is seated in the opening.

19. The fuel filtration system of an engine of claim 18, wherein the standpipe is configured to permit fuel to flow into the fuel passageway of the standpipe at the second non-zero fuel flow rate when the ball is seated in the opening at the second extreme position.

20. The fuel filtration system of an engine of claim 18, wherein:
a) the ball includes grooves formed therein, the grooves permitting fuel to flow past the ball when the ball is seated in the opening at the second extreme position; or
b) the opening includes slots formed therein, the slots permitting fuel to flow past the ball when the ball is seated in the opening at the second extreme position; or
c) a loose tolerance is provided between the ball and the opening, the loose tolerance permitting fuel to flow past the ball when the ball is seated in the opening at the second extreme position.

21. The fuel filter assembly of an engine of claim 11, wherein the ball and the opening in the standpipe are configured to permit the ball to seat in the opening at the second extreme movement position, the ball blocking a majority of the opening when the ball is seated in the opening.

22. The fuel filter assembly of an engine of claim 21, wherein the ball is configured to permit fuel to flow past the ball through the opening when the ball is seated in the opening at the second extreme position.

23. The fuel filtration system of an engine of claim 16, wherein the valve is a ball, and the ball and the opening in the standpipe are configured to permit the ball to seat in the opening at the second extreme movement position, the ball blocking a majority of the opening when the ball is seated in the opening.

24. The fuel filtration system of an engine of claim 23, wherein the ball is configured to permit fuel to flow past the ball through the opening when the ball is seated in the opening at the second extreme position.

* * * * *